Aug. 23, 1960 J. B. LE POOLE 2,950,405
ELECTRON-OPTICAL DEVICE
Filed Feb. 16, 1959
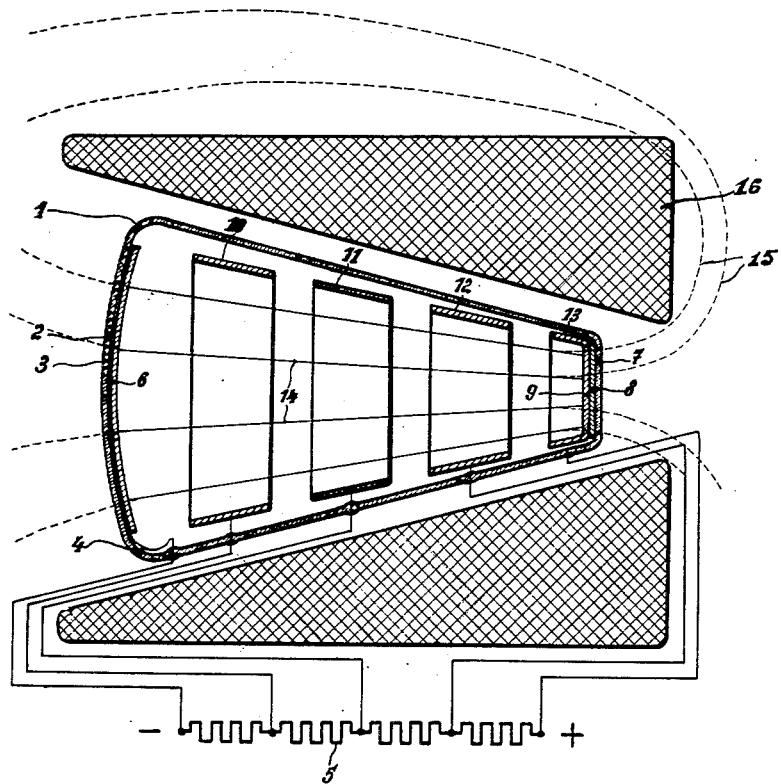
INVENTOR:
Jan B. Le POOLE
BY:
Wenderoth, Lind + Ponack
Attys

United States Patent Office 2,950,405
Patented Aug. 23, 1960

2,950,405

ELECTRON-OPTICAL DEVICE

Jan Bart Le Poole, Delft, Netherlands, assignor to N.V. Optische Industrie "De Oude Delft," Delft, Netherlands Filed Feb. 16, 1959, Ser. No. 793,357

Claims priority, application Netherlands Feb. 18, 1958

4 Claims. (Cl. 313—65)

This invention relates to electron-optical devices of the type in which a spherical electron-emitting photo-cathode is imaged on a receiving screen by means of an electric field whose equipotential surfaces in the effective region between the electron-emitting photo-cathode and an anode are substantially shaped as parts of spheres which are concentric with the photo-cathode.

A well-known electron-optical imagery device is the image converter or image intensifier as is frequently used for making visible optical images whose brightness is insufficient to be viewed directly or whose "color" lies outside the visible spectrum (e.g. infra-red images). An image converter consists of a vacuum tube to one end of which a photo-cathode is applied, that is to say a thin layer of a substance which is capable of emitting electrons under the influence of incident electro-magnetic radiation. The photo-cathode is connected to the negative terminal of a source of D.C. voltage. In the tube there is further mounted one or a number of electrodes which are positive with respect to the photo-cathode and are active in setting up an electric field which accelerates and focuses electrons emitted by a point on the photo-cathode in the corresponding image point on a fluorescent receiving screen.

Of course, in addition to the sharpness of the image on the axis of the tube also the extension of the useful field of view is of interest, that is to say the dimensions of the part of the photo-cathode area which is imaged with reasonable accuracy on the receiving screen. From the Netherlands patent specification 75,366 it is known that in an image converter which is provided with a concave spherical photo-cathode and an anode which is also spherical and is axially spaced a variable distance from the photo-cathode, the useful field of view attains its maximum value when the photo-cathode and the anode are concentric. This observation shows analogy to the fact which is well-known in light optics, that in concentric optical systems, i.e. systems whose refracting and/or reflecting surfaces are spherical and have a common center of curvature, the field of view is in no respect limited by the abberations of the systems becoming excessive for oblique beams of rays.

It can be easily shown by calculation that in an electron-optical tube of the type concerned no sharp image with positive magnification, that is to say no erect image, can be formed by applying a purely concentric electrostatic field or, in other words, that focusing of the electrons is only possible on a receiving screen which is located at a place behind the common center of curvature of the equipotential surfaces and the image obtained is reversed. In the image converter according to the Netherlands patent specification 75,366 the latter focusing actually occurs by that the anode is substantially shaped as a small thimble, whose spherical front wall facing the photo-cathode is provided with a narrow aperture leaving passage for the accelerated electrons toward the fluorescent screen which is placed a relatively large distance behind the aperture in the field free interior space of the thimble. Of course, the necessary aperture in the anode disturbs in a rather radical manner the concentric shape of the equipotential surfaces in the important region near the anode and gives rise to additional aberrations in the oblique beams which limit the field of view.

It is a primary object of the invention to avoid the above-mentioned drawback by providing the means capable of giving the desired focusing of the electron beams without destroying in an undesirable manner the concentricity of the field. A further object is to provide an electron-optical device having a better off-axis definition and/or a larger field of view than heretofore possible. Another object is to provide an electron-optical device having a shorter length than prior devices of comparable type. Still another object is to provide an electron-optical device of the type initially referred to whose photo-cathode is less strongly curved than those of prior devices of this type.

According to the invention the photo-cathode and the receiving screen are located on one and the same side of the center of curvature of the photo-cathode and the device is provided with means for setting up a magnetic field in the space between the photo-cathode and the receiving screen whose field lines are substantially perpendicular to the equipotential surfaces of the electric field.

It is apparent that, by giving the magnetic field strength the right value the additional focusing action of the concentric magnetic field may result in the focusing of the electron beams in the plane of the receiving screen located before the center of curvature of the photo-cathode. The electro-static field may be therefore purely concentric throughout the region where it has a marked influence on the electron beams without an infinitely high field strength in one point, to wit the center of curvature of the field, being necessary.

It will be apparent that an electron-optical tube according to the invention can be made much shorter than previous comparable tubes having only an electrostatic focusing field due to the fact that the receiving screen is placed a considerable distance in front of the center of curvature instead of behind it. Moreover, for the same reason, it will be possible in a number of cases to considerably increase the radius of curvature of the photo-cathode if compared to previous electrostatic tubes whereby the problem of designing an optical system having a suitable curvature of field to be used in front of the tube is much facilitated.

A well-known drawback of magnetic electron lenses consists in that the imaged formed by them as a rule is rotated through a certain angle with respect to the object which angle depends on the strength of field. Consequently, in magnetic electronoptics the fields must be held constant rigorously if optical complications connected with a variable image rotation are to be avoided. It may be noted, however, that in the device according to the invention the magnetic focusing field can not cause image rotation by the fact that the principal rays (which term may designate the central rays of the electron beams corresponding to the various image points, or the trajectories of electrons leaving the photo-cathode at zero lateral velocity) follow the magnetic field lines and, consequently, are not influenced by the magnetic field. The superposition of the magnetic field accordingly does not necessitate special optical provisions or rigorous stabilization of the electric current source.

The means for exciting the electric and magnetic fields in the device according to the invention can of course be constructed in various ways. For the magnetic field in the first place solenoids of susbtantially rotational symmetrical form may be used, whose ampere-turns may be so distributed along the axis of the tube as to make the magnetic field lines coincide with the field lines of the concentric electric field. Alternatively, suitably shaped permanent magnets may be used. A permanent magnet assembly for this purpose may comprise a number of annular magnets which, together with an equal number of pure iron rings, are assembled to a pack which coaxially receives the tube. The axial distance and the inner diameters of the rings may be adjusted so as to obtain the desired shape of the magnetic field lines.

It may be pointed out that the fields in the device according to the invention need not be exactly concentric and the field lines need not be exactly coincident in order to minimize the aberrations over a large image field. Deviations from the exact conditions are allowable more particularly in the portion of the field near the receiving screen as the electrons in this area having a high speed and the cross-section of the pencils of rays corresponding to the various points in the image is comparatively small. Hence the focusing of the electrons on the receiving screen will not be influenced to such a marked degree by deviations from concentricity in the region of the anode, as was the case in previous tubes having their receiving screen a relatively large distance behind the anode. In particular, the anode need not be concentric with the photo-cathode but may be made plane for instance, or may even be given the form of a cup having a ledge extending toward the photo-cathode.

In the drawing there is shown an image converter as an example of the device envisaged by the present invention.

The evacuated tube 1 has a generally frusto-conical shape and its front wall 2 is spherical and provided with a thin, electrically conducting film 3 which is transmissive for radiation incident from the left and is connected by a lead 4 to the negative terminal of a voltage divider 5. On the film 3 a photo-cathode 6 is applied which, dependent on the nature of the radiation concerned, may be composed in several ways well-known in the art.

The inner surface of the plane rear wall 7 of the tube is provided with a fluorescent layer 8, on which a thin preferably opaque layer 9 of an electrically conductive material is deposited. This film 9 is conductively connected to the most positive terminal of the voltage divider 5 and constitutes the anode of the tube.

The tube further comprises a number of frusto-conical rings 10, 11 and 12 which are centered with respect to the tube axis and by being connected to intermediate terminals of the voltage divider 5 have potentials increasing in the direction of the anode. The anode is conductively connected to a frusto-conical, annular electrode member 13. Number, shape and potentials of the electrodes are such that the electro-static field lines 14 in the space between the photo-cathode and the receiving screen are in good approximation straight and converging toward the center of curvature of the spherical photo-cathode 6. The equipotential surfaces of the electrostatic field are then of course concentric with the photo-cathode.

In a device constructed merely in accordance with the above the electrons emitted by a point on the photo-cathode could not be focused on the reeciving screen 9. According to the invention focusing is now made possible while maintaining the concentricity of the electrostatic field by superposing a magnetostatic field, whose field lines 15 in the space between the photo-cathode and the receiving screen are in good approximation coincident with the electric field lines. To this end a ring-shaped field coil 16 having a conical axial aperture is placed around the tube whose ampere-turns are distributed over its length in such a manner that the condition explained above is fulfilled. The coil can be connected by terminals not shown in the drawing to a source of constant direct current. Of course the required magnetic field can be obtained also by means of solenoids of different shape according to varying conditions of the practical embodiments concerned. In each case those skilled in the art will be capable of determining by calculation or experiment the dimensions and other particulars of the required coil. It will be noted however that the embodiment illustrated in the drawing is advantageous in account of its very compact construction.

It should be mentioned that, according to previous proposals, it is known in the art to superpose in electron-optical tubes an electrostatic and a magnetostatic field in such a way that the magnetic field lines coincide with the principal electron rays. It has also been proposed previously to combine, in an image converter having a 1:1 magnification uniform electrostatic and electromagnetic fields of which the field lines coincide everywhere. The useful conception of the present invention according to which concentric electric and magnetic fields are superposed in order to arrive at less aberrations in a greater field of view has never been contemplated before, however.

The application of the described inventive conception is of course not limited to the image converter particularly referred to in this specification. In image converters having a convex photo-cathode of which an enlarged image is formed on a concave fluorescent screen substantially the same advantages may be obtained. On the other hand the invention may be applied at advantage in other types of electron-optical tubes where the magnification is not too high, e.g. in television pick-up tubes.

What I claim is:

1. A device for electron-optical imagery including a vacuum tube comprising a spherical photo-cathode electrode capable of emitting a photo-electron image current in response to a radiation image projected thereon, a receiving screen spaced from said photo-cathode a distance shorter than the radius of curvature of said photo-cathode for receiving said photo-electron image current, electrode means in said vacuum tube to set up an electrostatic field for directing said photo-electron image current onto said receiving screen, said electrostatic field having substantially spherical equipotential surfaces concentric with said photo-cathode substantially throughout the effective region of electron current flow between said photocathode and said receiving screen, and means for setting up a magnetostatic field, whose field lines, throughout said effective region, are substantially perpendicular to the equipotential surfaces of said electrostatic field whereby said photo-electron image current is brought to focus on said receiving screen to form an erect replica image thereon.

2. A device for electron-optical imagery including a vacuum tube comprising a concave spherical photo-cathode electrode capable of emitting a photo-electron image current in response to a radiation image projected thereon, a receiving screen in the path of said photo-electron image current spaced from said photo-cathode a distance shorter than the radius of curvature of said photo-cathode for receiving a reduced, erect replica electron image of said radiation image, electrode means in said vacuum tube to set up an electrostatic field for directing said photo-electron image current onto said receiving screen, said electrostatic field having substantially spherical equipotential surfaces concentric with said photo-cathode substantially throughout the effective region of electron-current flow between said photo-cathode and said receiving screen, and means for setting up a magnetostatic electron focussing field whose field lines, throughout said effective region, are substantially perpendicular to the equipotential surfaces of said electrostatic field, said means for setting up a magnetostatic field including a long electromagnetic coil arranged about said vacuum tube and having a variable number of ampere-turns per unit of length increasing in the direction towards said receiving screen.

3. A device for electron-optical imagery, comprising an electron discharge tube of frusto-optical shape, a spherical photo-cathode electrode at the larger end of said tube which is concave towards the other end and is capable of emitting a photo-electron image current in response to an optical image projected thereon, a substantially flat receiving screen disposed in the path of said photo-electron image current at a distance from said photo-cathode shorter than the radius of curvature thereof, a plurality of annular electrodes in said tube centered on the axis of said tubes and having decreasing diameters from the larger end of said tube towards the other end, means for imposing electric potentials on said annular electrodes increasing in the direction from said larger end of said tube towards the other end to set up an electrostatic field in the space between said photo-cathode and said receiving screen whose equipotential surfaces are substantially spherical and concentric with said photo-cathode, an electromagnetic coil surrounding said tube and having a length exceeding that of the tube, said coil having a number of ampere-turns per unit of length increasing in the direction from said larger end of said tube towards the other end to set up a magneto-static field whose field lines are substantially perpendicular to the equipotential surfaces of said electro-static field whereby focussing of said photo-electron image current on said receiving screen is obtained and a reduced, erect replica electron image is produced on said screen.

4. A device as claimed in claim 3, wherein said annular electrodes are frusto-conical having their larger ends on the side of the larger end of the tube.

References Cited in the file of this patent

UNITED STATES PATENTS

| | | |
|---|---|---|
| 2,123,412 | Gardner | July 12, 1938 |
| 2,151,530 | Ruska | Mar. 21, 1939 |
| 2,203,734 | Lubszynski | June 11, 1940 |
| 2,691,612 | Cohen | Oct. 12, 1954 |